Patented Nov. 9, 1937

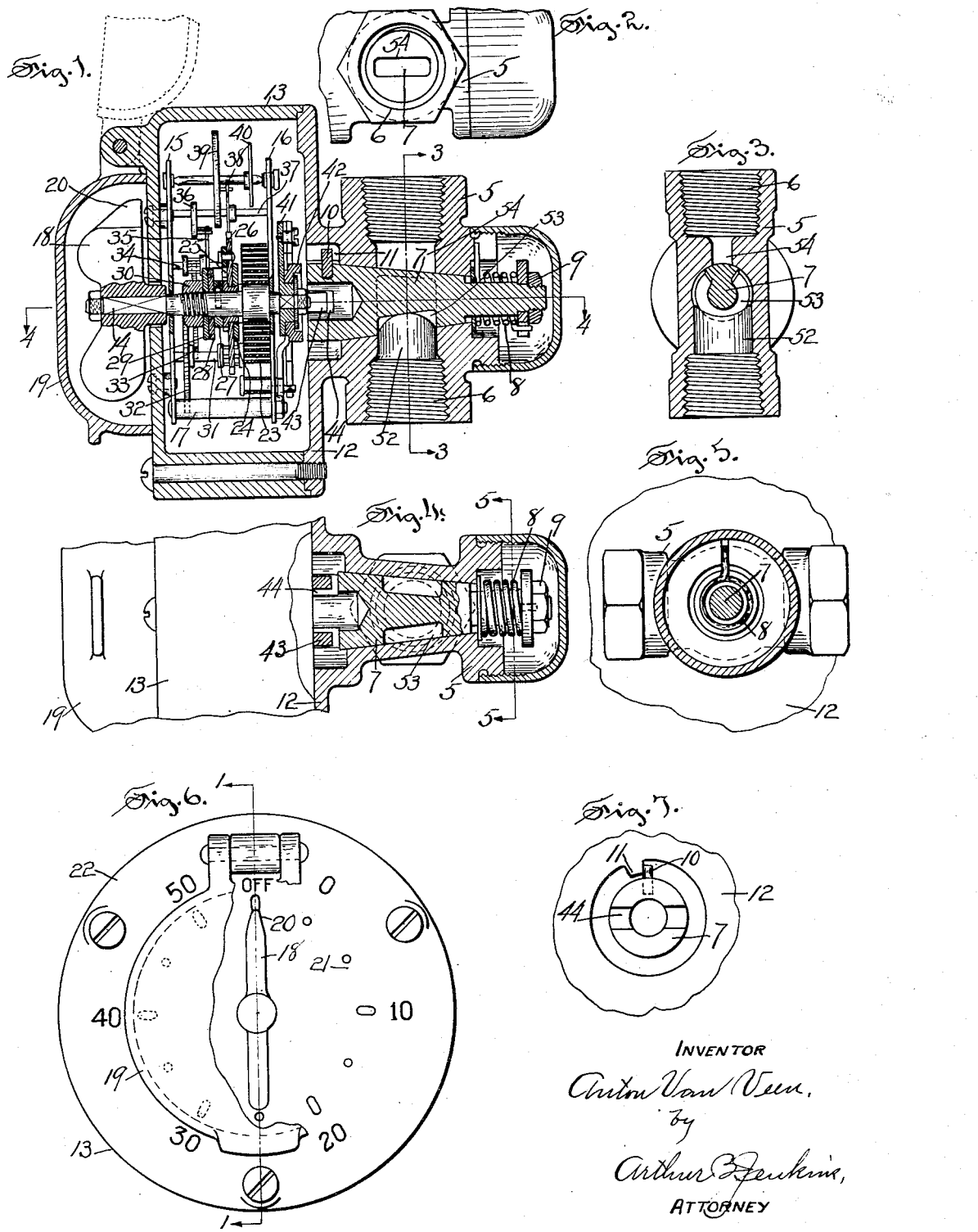

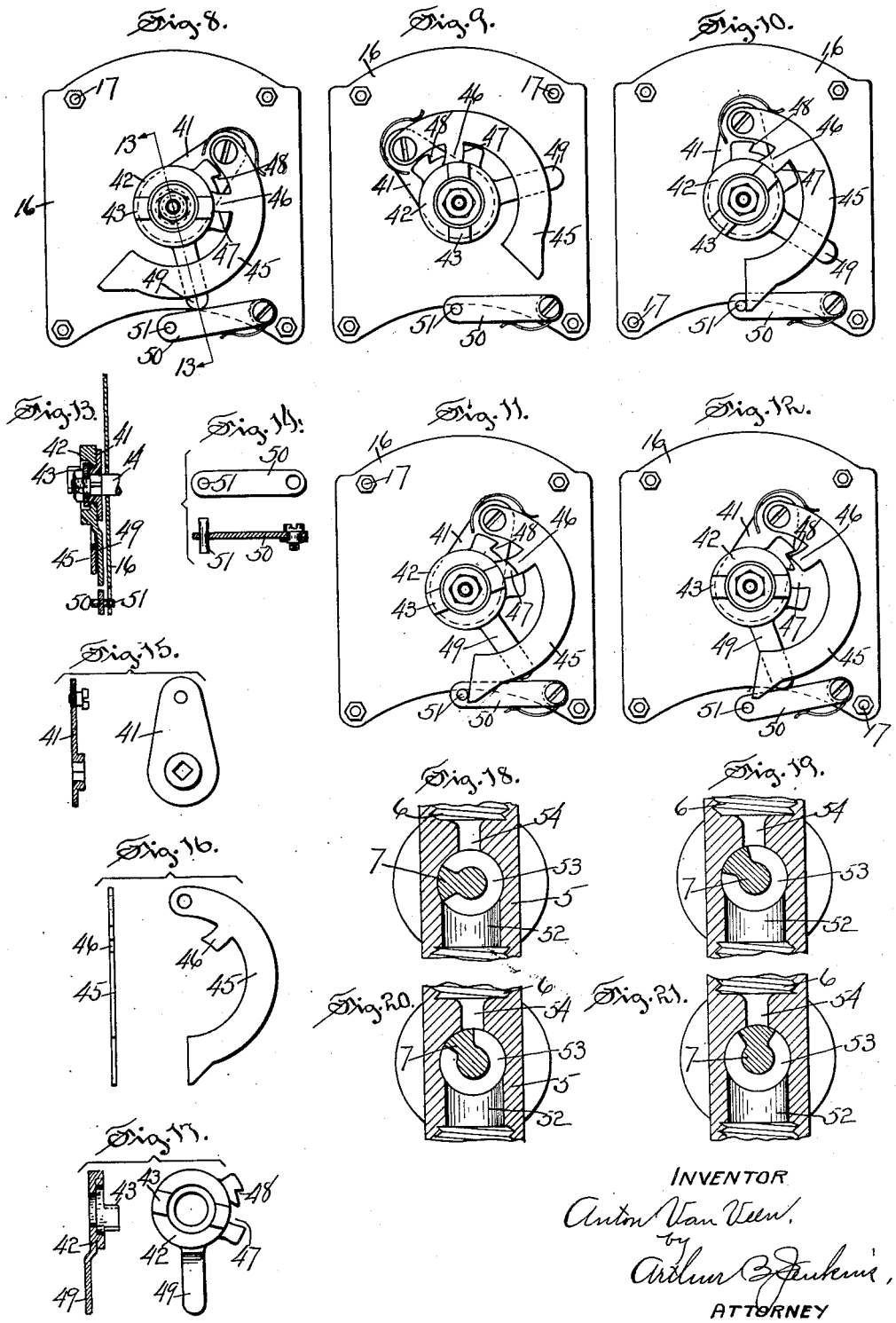

2,098,815

UNITED STATES PATENT OFFICE 2,098,815

SELF-ACTUATING VALVE

Anton Van Veen, West Hartford, Conn.

Application October 1, 1931, Serial No. 566,190
Renewed March 3, 1936

11 Claims. (Cl. 161—9)

My invention relates to that class of valves that may be automatically opened and/or closed at predetermined intervals, and an object of my invention, among others, is to provide a valve of this type of simple construction and one that shall be reliable and effective in operation.

One form of a valve embodying my invention and in the construction and use of which the objects herein set out, as well as others, may be attained is illustrated in the accompanying drawings, in which—

Figure 1 is a view in central lengthwise section through a valve embodying my invention and through an operating mechanism for said valve and on a plane denoted by the dotted line 1—1 of Figure 6.

Figure 2 is a side view of the valve.

Figure 3 is a view in section on a plane denoted by the dotted line 3—3 of Figure 1.

Figure 4 is a view in section through the valve on a plane located at right angles to the plane of section of Figure 1, a portion only of the motor case being shown in full. The section shown is on a plane denoted by the dotted line 4—4 of Figure 1.

Figure 5 is a view in section on a plane denoted by the dotted line 5—5 of Figure 4.

Figure 6 is a front face view of the device with parts broken away to show construction.

Figure 7 is a detail end view of the valve looking from the left as shown in Figure 1, a portion of the valve supporting plate also being shown.

Figure 8 is a face view of the frame for the regulating mechanism and illustrating the valve releasing mechanism, the parts being shown in a position when the valve is closed.

Figure 9 is a similar view but showing the parts in position with the valve open.

Figure 10 is another similar view illustrating the position of the parts after the valve has started to close.

Figure 11 illustrates the same mechanism with the parts in position just before the valve is released for closing.

Figure 12 illustrates the position of the parts of said mechanism just after the valve has closed but before the parts have been reset in the final closing movement of the valve.

Figure 13 is a view in section on a plane denoted by the dotted line 13—13 of Figure 8.

Figure 14 is a face view and a lengthwise sectional view illustrating the latch disengaging lever.

Figure 15 is a similar view of the latch supporting arm.

Figure 16 is a face and edge view of the latch lever.

Figure 17 is a face and lengthwise sectional view of the coupling disk.

Figure 18 is a view in lengthwise section through a portion of the valve case illustrating the position of the valve when it is fully opened.

Figure 19 is a similar view illustrating the position of the valve in an intermediate position.

Figure 20 is another similar view illustrating the position of the valve just before its release for closing.

Figure 21 is still another similar view illustrating the position of the valve when closed.

While my improved valve including its operating mechanism may be aplied to widely varied uses, yet, as it is peculiarly applicable to valves for controlling flow of fluids, and particularly illuminating gas, such an adaptation has been shown herein, it being understood, however, that it is not limited to use in this connection.

In the accompanying drawings the numeral 5 denotes a valve case that may be composed of any suitable material, said case having a valve passage 6 extending therethrough, the ends of said passage being suitably threaded to receive pipes for flow of gas. A valve 7 preferably of tapered form is rotatably mounted in the case 5 said valve being held to its seat as by means of a spring 8 seating against a washer held by a nut 9 on the end of the valve in a manner common to structures of this type. The spring 8 also acts to rotate the valve and a stop 10 in the form of a pin projecting laterally from the valve acts against a stop lug 11 in a recess in the end of the valve case to prevent rotation of the valve after it is moved to a predetermined, as to a closed, position, the spring 8, as in the present instance, acting to close the valve after it has been opened. A flange at one end of the valve case serves as a cover 12 for a motor case 13, said cover being secured in place in any suitable manner, as by means of screws.

A winding and valve operating shaft or arbor 14 is rotatably mounted in supporting plates 15—16 secured within the case 13, the plate 15 being secured to the end of the case and the plate 16 being supported as by means of posts 17 rigidly secured to the plate 15, and as shown in Figure 1 of the drawings. An operating key 18 is secured to the shaft 14 outside of the case, and a hood 19 is pivotally attached to the end of the case 13 to enclose said key, one end of said key being tapered toward its edge to form an indicator 20 that operates in connection with an index 21 displayed on the front face 22 of the case 13 and preferably underneath the hood 19, and as shown in Figure 6 of the drawings.

The shaft or arbor 14 has a driving spring 23 secured at one end to it, the opposite end of said spring being secured to the plate 16. The motor including this spring is of a general character similar to that of a regular clock mechanism which mechanism, however, is not illustrated in detail herein, as it will be readily understood by those skilled in the art.

Briefly described, this mechanism includes a ratchet wheel 24 mounted on the arbor 14 and having a pawl 25 engaged therewith, said pawl being pivotally mounted on a gear 26. This gear is loosely mounted on the hub of the ratchet and the latter is frictionally secured to the arbor 14 as by means of a spacer 27 splined to the arbor and friction plates 28—29 mounted on the arbor and pressed against each other as by a nut 30. The nut and the friction plates create a frictional engagement between the spacer 27 and the ratchet wheel 24 such that the arbor 14 may be independently turned to close the valve as hereinafter explained.

A regulating mechanism to control the unwinding movement of the arbor 14 under the influence of the spring 23 is provided in the nature of a clock mechanism, briefly speaking, this consisting of an arbor 31 having a pinion meshing with the gear 26 and a gear 32 meshing with a pinion on an arbor, not shown, but having a gear 33 meshing with a pinion on an arbor 34.

The arbor 34 bears an arm 35 having teeth that are alternately engaged by pins projecting from a disk 36. This disk and its pins comprise a scape member and the arm with its teeth comprise a pallet member the arrangement and operation of which will be well understood by those skilled in the art. The disk 36 is secured to a rock shaft 37 mounted in the plates 15—16, said shaft having a rocking lever 38 extending therefrom that has a slot engaged by a pin extending from a balance wheel 39 secured to an arbor, the latter being mounted in the plates 15—16 and having the usual rocking movement imparted thereto by means of a hair spring 40, all as illustrated in Figure 1 of the drawings.

An accelerating device to quickly close the valve, after it has been partially closed by the mechanism hereinbefore described, comprises a supporting arm 41 secured to the arbor 14 outside of the plate 16, said arm having a hub upon which a coupling disk 42 is secured as by means of a washer and nut located in a recess in said disk, as shown in Figure 1, the nut being secured to the screw threaded end of the arbor 14. Coupling lugs 43 project from the disk 42 into slots 44 formed in the end of the valve 7.

This accelerating or releasing mechanism further comprises a latch lever 45 pivotally mounted at one end on the supporting arm 41 and curving around the coupling disc 42, as shown in Figure 8 of the drawings. Said lever is spring pressed inwardly toward said disc and a latch lug 46 projects from the edge of the lever into a holding notch 47 formed in the edge of said disc when the parts are in the position shown in Figure 8, in which position the valve is closed. The disc 42 also has a repositioning notch 48 close to the notch 47 and a latch disengaging finger 49 projects from said disc across the latch lever 45. A latch disengaging lever 50 is pivotally mounted on the plate 16 of the frame and is spring pressed toward the edge of said plate.

A stop pin 51 projects through said lever on opposite sides thereof, one projecting end limiting movement of the lever toward the plate 16 and the other projecting end engaging the free end of the latch lever 45 to release the lug 46 from the notch 47 in a manner to be hereinafter described.

The valve 7 and the case 5 are of peculiar construction in order to effect a full supply of gas during a material part of the closing movement of the valve. The inlet passage 52 in said case opens into a valve chamber 53, and a supply port 54 from said chamber leads into the outlet passage from the case. The valve is of a width much less than the distance around the chamber 53, this width being such as to slightly overlap opposite edges of the port 54 when the valve is closed, and as shown in Figure 21 of the drawings.

This mechanism is of particular value in connection with gas stoves or similar heating appliances and enables the operation of a burner for a predetermined period, at the end of which time the gas will be shut off, this requiring no particular attention to terminate the heating operation. The index or dial 21 is arranged to denote the time that will elapse between the opening of the valve and the closing thereof, the mechanism being so arranged that when the key 18 is turned in a clockwise direction to any of the numerals the time indicated will elapse before the valve will be closed and the flame extinguished.

The arrangement is such that either the spring 8 or the clock or driving spring 23 will rotate the valve to its closed position, should either spring break. In normal operation the valve is closed by the spring 8 and the regulating mechanism merely restrains the spring 8 in its operation to close the valve. Each time the valve is opened by turning the key 18 the spring 23 will be tensioned to a certain degree and it will be untensioned to the same extent in its operation to close the valve, the tension of said spring therefore being always operatively maintained.

In the operation of the device the key 18 being turned to register with one of the numerals on the dial the spring 23 will be wound to a certain extent and the spring 8 will be tensioned. The valve having been opened, as an illustration to the position shown in Figure 18, a period of approximately ten minutes will elapse before it will be shut off and the flame extinguished.

This operation of opening the valve will place the parts of the releasing mechanism in substantially the position shown in Figure 9 and the regulating mechanism at once begins to function to regulate the closing movement of the valve, the valve and arbor 14 being rigidly connected by the lug 46 engaged in the notch 47. In this closing movement after a lapse of a certain period the end of the lever 45 encounters the stop pin 51 in the end of the lever 50 thereby stopping movement of the arm 41 and lever 45 and the valve 7. The disk 42, however, continues to rotate under the influence of the spring 8 with the result that the lug 46 is gradually withdrawn from the notch 47 into the position shown in Figure 11, the cam shape of the lug 46 and notch 47 permitting this movement of said disk independently of the lever 45 during such withdrawal. When this position of the parts is reached the spring 8 promptly forces the disk 42 to the position shown in Figure 12, rotation being stopped by engagement of the pin 10 with the lug 11, the lever 50 being depressed by the finger 49 in this operation. In this position of the parts the valve is closed as shown in Figure 21, but the arm 41 and lever 45 continue to rotate for a brief period under influence of the clock spring 23 until the lug 46 again enters the notch 47 the parts then being in the position shown in Figure 8, when all of the mechanism ceases to operate and such mechanism is placed in position for another operation. It will be noted that should the operation just described be interrupted, as by suddenly opening the valve by manual operation of the key 18, the operation of the latch 45 will continue only from the point of interruption, that is, the valve will not be again snapped to its closed position until the parts have been reset.

The lip on the lower side of the notch 47 is made longer than on the opposite side to prevent the lug 46 from being moved beyond the notch in this direction.

The valve is an important feature of the invention, being so constructed that a full flow of gas is maintained substantially up to the time of final closing movement, and a maximum degree of heat is therefore supplied, providing for uniform heating for the full time limit indicated by the dial or index 21.

To accomplish this purpose I so form the valve 7 that it is only slightly wider than the supply port 54 so that when closed the valve only slightly overlaps opposite edges of said port and I also undercut the valve just back of its face, said undercut portions extending substantially radially of the valve, and the center portion is of such size that the width of the chamber 53 on opposite sides of the valve in said chamber is at least as great as the width of the supply port 54. As a result of this construction as much gas as can pass through the port 54 is continuously supplied to said port up to substantially the time that the valve is closed and a full and uniform amount of heat is maintained up to that time, and the valve may be turned backwardly or opened almost a complete turn without changing this condition, thereby permitting the valve to remain open for a maximum length of time when desired.

In accordance with the provisions of the patent statutes I have described the principles of operation of my invention together with the device which I now consider to represent the best embodiment thereof; but I desire to have it understood that the device shown is only illustrative, and that the invention may be carried out by other means and applied to uses other than those above set out.

I claim:

1. A self-actuating valve including a valve case with a valve therein, a spring for continuously rotating said valve during the period in which the valve is open, and a regulating mechanism including a spring actuated main arbor operatively connected to said valve for operation thereof, means for operating said regulating mechanism by the turning movement of said valve, and an interruptable connection between said valve and said regulating mechanism to permit independent movement of said valve.

2. A self-actuating valve including a valve case with a valve therein, a spring for continuously rotating said valve during the period in which the valve is open, and a regulating mechanism including a main arbor, a spring of less strength than said valve spring secured to rotate said arbor independently of said valve, means for restraining and regulating rotation of said arbor, and an interruptable connection between said valve and regulating mechanism to permit independent movement of said valve.

3. A self-actuating valve including a valve case with a valve therein, a spring for continuously rotating said valve during the period in which the valve is open, and a regulating mechanism including a main arbor, means for regulating and restraining rotation of said arbor, a key attached to said arbor to rotate it, and an interruptable connection between said valve and said main arbor of said regulating mechanism to permit independent movement of said valve.

4. A self-actuating valve including a valve case with a valve therein, a spring for continuously rotating said valve during the period in which the valve is open, and a regulating mechanism including a main arbor, means for regulating and restraining rotation of said arbor, a key attached to said arbor to rotate it, and a yielding frictional connection between said restraining mechanism and said main arbor of said regulating mechanism to permit independent rotation thereof by force applied to said key, and an interruptable connection between said valve and said arbor of said regulating mechanism to permit independent movement of said valve.

5. A self-actuating valve including a valve case with a valve therein, means for rotating said valve, and a regulating mechanism connected with said valve to regulate the period of its turning movement, means for permitting said valve to turn independently of said regulating mechanism to effect quick closing movement thereof, means for temporarily disconnecting said valve from said regulating mechanism to permit said independent rotation, means for stopping the turning movement of said valve, means included in said regulating mechanism to effect further turning movement of the regulating mechanism independently of the valve to reset the disconnecting mechanism after said temporary disconnection, and means for stopping the turning movement of said regulating mechanism.

6. A self-actuating valve including a valve case with a valve therein, means for continuously rotating said valve during the period in which the valve is open, means for restraining said rotating movement, a regulating mechanism to regulate the period of rotating movement of said valve, an interruptable connection between said valve and regulating mechanism for permitting said valve to rotate independently of said regulating mechanism to effect quick closing movement of said valve, means for temporarily disconnecting said connection to permit said independent rotation, and means for effecting continued operation of said regulating mechanism after closing of the valve, to reset said disconnecting means.

7. A self-actuating valve including a valve case, with a valve therein, means for rotating said valve, a regulating mechanism connected with said valve to regulate the period of its turning movement, means for effecting turning movement of said valve independently of said regulating mechanism, means for temporarily disconnecting said valve from said regulating mechanism to permit said independent rotation, and means for operating said regulating mechanism to effect its rotation independently of said valve.

8. A self-actuating valve including a valve case with a valve therein, means for rotating said valve, a regulating mechanism connected with said valve to regulate the period of its turning movement, means for permitting said valve to turn independently of said regulating mechanism, means for temporarily disconnecting said valve from said regulating mechanism to permit said independent rotation, means for operating said regulating mechanism independently of said valve, and means for stopping rotation of said valve and of said regulating mechanism.

9. A self-actuating valve including a valve case with a valve therein, means for rotating said valve, a regulating mechanism connected with said valve to regulate the period of its turning movement and including a pivotally mounted latch, means for operating said latch to disconnect said regulating mechanism from said valve to permit independent turning movement of the valve, means for effecting continued operation of the regulating mechanism after closing of the valve and means for reengaging said latch with said regulating mechanism.

10. A self-actuating valve including a valve case with a valve therein, means for rotating said valve, means for stopping said rotation, a regulating mechanism, means for operating said regulating mechanism, and connecting means between said valve and said regulating mechanism, said connecting means including means for disconnecting the valve from the regulating mechanism to permit movement of the former independently of the latter and then, after rotation of the valve has ceased, to permit operation of the regulating mechanism independently of the valve to reset the mechanism for a repeated operation.

11. A self-actuating valve including a valve case with a valve therein, means for rotating said valve, means for stopping its movement, a regulating mechanism, means for operating said regulating mechanism independently of said valve, a connecting means between said valve and regulating mechanism, said connecting means including a clutch, means for disconnecting said clutch to permit independent movement of said valve, and means for reengaging said clutch members in the independent movement of the valve regulating mechanism.

ANTON VAN VEEN.